(12) United States Patent
Goulet

(10) Patent No.: US 10,843,562 B2
(45) Date of Patent: Nov. 24, 2020

(54) STEERING SYSTEM FOR A VEHICLE HAVING A MAGNETIC PADDLE SHIFT SYSTEM

(71) Applicant: KA Group AG, Zürich (CH)

(72) Inventor: Martin Goulet, Drummondville (CA)

(73) Assignee: KA Group AG, Zürich (CH)

( * ) Notice: Subject to any disclaimer, the term of this patent is extended or adjusted under 35 U.S.C. 154(b) by 0 days.

(21) Appl. No.: 16/840,998

(22) Filed: Apr. 6, 2020

(65) Prior Publication Data
US 2020/0317249 A1    Oct. 8, 2020

Related U.S. Application Data

(60) Provisional application No. 62/829,978, filed on Apr. 5, 2019.

(51) Int. Cl.
| | | |
|---|---|---|
| *B62D 1/04* | (2006.01) | |
| *B60K 20/06* | (2006.01) | |
| *F16H 59/02* | (2006.01) | |
| *B62D 15/02* | (2006.01) | |

(52) U.S. Cl.
CPC .............. *B60K 20/06* (2013.01); *B62D 1/046* (2013.01); *B62D 15/022* (2013.01); *F16H 2059/0239* (2013.01); *F16H 2059/0247* (2013.01)

(58) Field of Classification Search
CPC . B62D 1/04; B62D 1/046; B62D 1/16; B62D 15/022; B60K 20/06; F16H 59/0204; F16H 2059/0226; F16H 2059/0239; F16H 2059/0247

See application file for complete search history.

(56) References Cited

U.S. PATENT DOCUMENTS

| | | |
|---|---|---|
| 5,646,523 A | 7/1997 | Kaiser et al. |
| 6,837,116 B2 | 1/2005 | Desbiolles |
| | (Continued) | |

OTHER PUBLICATIONS

Automobile Magazine, "FCA Recalls 500,000 Jeep Wranglers Due to Faulty Clockspring Assembly", https://www.automobilemag.com/news/fca-recalls-500000-jeep-wranglers-due-faulty-steering-components/, May 20, 2016, 3 pages.

(Continued)

*Primary Examiner* — Adam D Rogers
(74) *Attorney, Agent, or Firm* — Howard & Howard Attorneys PLLC

(57) ABSTRACT

A steering system for a vehicle includes a steering column, a steering wheel rotatable about an axis between rotational positions, and a magnetic paddle shift system for selecting a gear of a transmission. A sensor assembly has a sensor array. First and second paddle shifters are rotatable with the steering wheel and extend from a proximal end to a distal end. First and second magnets are disposed at the proximal end of the first and second paddle shifters, respectively, in alignment with the sensor array in any of the rotational positions. Actuation of the first and second paddle shifters move, respectively, the first and second magnets relative to the sensor array between first and second positions, the magnets being closer to the sensor array in the second position. The sensor array is configured to sense the first and second magnets in the second position for any of the rotational positions.

20 Claims, 9 Drawing Sheets

(56) References Cited

U.S. PATENT DOCUMENTS

| | | | | |
|---|---|---|---|---|
| 7,278,510 | B1* | 10/2007 | Richards | B62D 1/046 |
| | | | | 180/336 |
| 7,775,884 | B1 | 8/2010 | McCauley | |
| 8,438,943 | B2* | 5/2013 | Herbert | F16H 59/02 |
| | | | | 180/336 |
| 8,915,342 | B2* | 12/2014 | Cook | B60K 20/06 |
| | | | | 192/3.55 |
| 8,920,240 | B2 | 12/2014 | Jaouen | |
| 8,973,701 | B2* | 3/2015 | Holihan | B60K 20/06 |
| | | | | 180/336 |
| 9,104,225 | B2* | 8/2015 | Pohanka | G05G 1/04 |
| 9,162,703 | B2* | 10/2015 | Miller | B62D 5/04 |
| 9,829,098 | B2* | 11/2017 | Fan | F16H 61/16 |
| 10,138,997 | B2* | 11/2018 | Ding | B60K 35/00 |
| 2002/0166389 | A1 | 11/2002 | Desbiolles | |
| 2011/0256930 | A1 | 10/2011 | Jaouen | |

OTHER PUBLICATIONS

Thrustmaster, Products Webpage—TS-PC RACER Ferrari 488 Challenge Edition, https://www.thrustmastercom/products/licences/ferrari, 2019, 1 page.

Wikipedia, "Clockspring", https://en.wikipedia.org/wiki/Clockspring, 2019, 1 page.

* cited by examiner

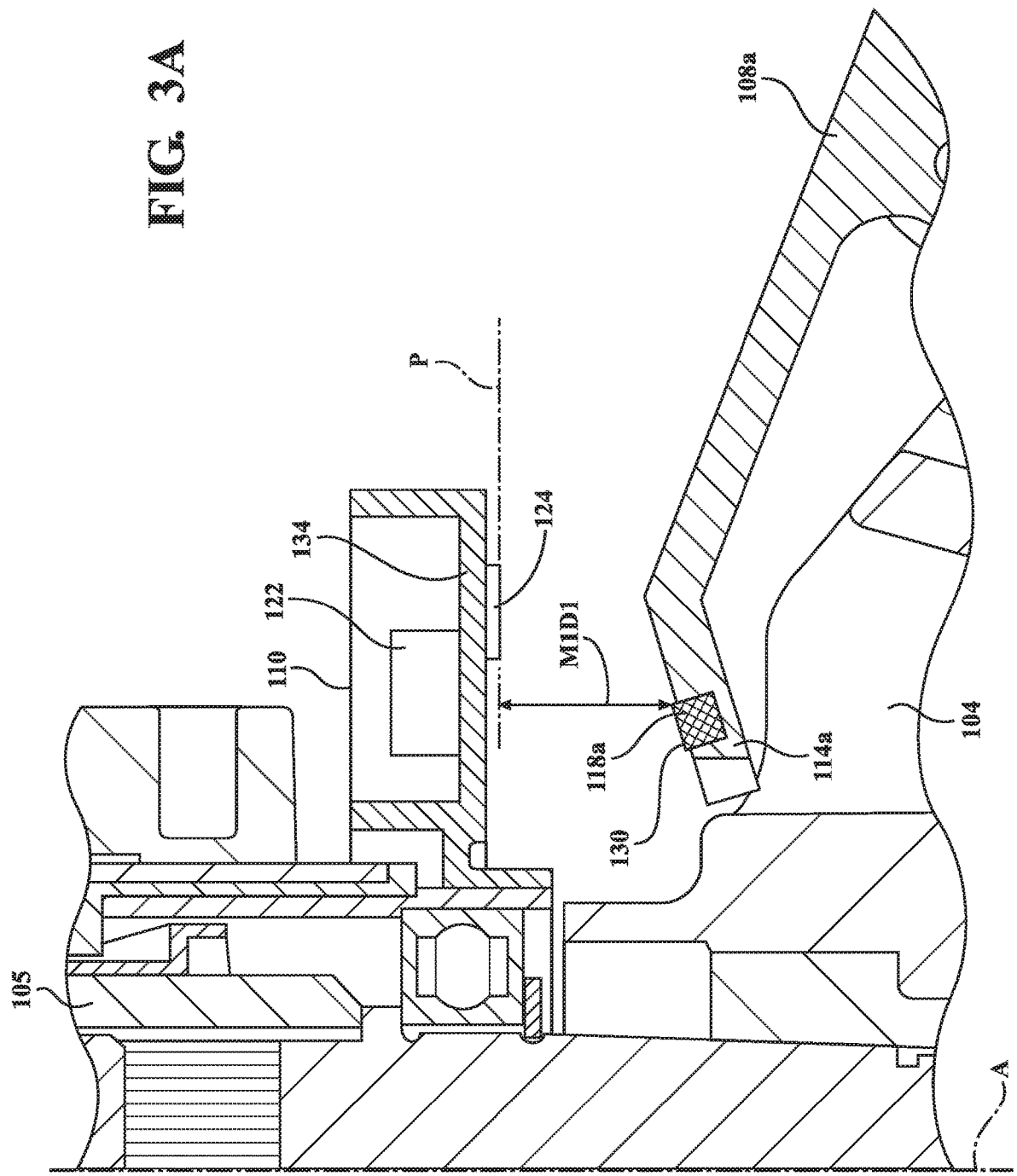

STEERING SYSTEM FOR A VEHICLE HAVING A MAGNETIC PADDLE SHIFT SYSTEM

RELATED APPLICATIONS

This application claims priority to and the benefit of U.S. Provisional Patent Application No. 62/829,978, filed on Apr. 5, 2019, the entire contents of which are hereby incorporated by reference.

TECHNICAL FIELD

The subject invention relates to a steering system for a vehicle having a magnetic paddle shift system.

BACKGROUND

Paddle shifters allow a driver to manually shift gears without a traditional clutch pedal and gear-shift lever. Paddle shifters are commonly mounted on the back of a steering wheel of a vehicle. A clock spring electrically connects the paddle shifters and other steering wheel components to the other electrical systems of the vehicle. Unless properly sealed, which adds expense, clock springs are prone to wear and tear and may not be suitable for harsh weather environments such as when the clock springs are repeatedly exposed to rain, snow, or mud.

To avoid using clock springs, some manufactures have moved the paddle shifters from the steering wheel to the steering column. As a result, the paddle shifters do not follow the driver's hand as the steering wheel is turned in these systems. Thus, a driver's hand may not be aligned properly to actuate the paddle shifters when the steering wheel is in certain orientation. As such, there remains a need to provide an improved steering system.

SUMMARY OF THE INVENTION AND ADVANTAGES

The subject invention provides for a steering system for a vehicle. The steering system includes a steering column extending longitudinally along an axis, a steering wheel coupled to the steering column and rotatable relative to the steering column about the axis between a plurality of rotational positions, and a magnetic paddle shift system for selecting a gear of a transmission of the vehicle. The magnetic paddle shift system includes a sensor assembly mounted to the steering column and comprising a sensor array disposed about the axis. The magnetic paddle shift system further includes first and second paddle shifters mounted to the steering wheel and spaced from one another about the axis and rotatable with the steering wheel about the axis relative to the sensor assembly between the plurality of rotational positions. Each of the first and second paddle shifters extending radially away from the axis from a proximal end closer to the axis to a distal end for engagement by a user.

The magnetic paddle shift system further includes a first magnet is disposed at the proximal end of the first paddle shifter, and a second magnet is disposed at the proximal end of the second paddle shifter with the first and second magnets disposed in alignment with the sensor array in any of the rotational positions of the steering wheel. Actuation of the first and second paddle shifters move, respectively, the first and second magnets relative to the sensor array between a first position and a second position. The first and second magnets are spaced apart from the sensor array in both of the first and second positions and are closer to the sensor array in the second position compared to the first position. The sensor array is configured to sense the first and second magnets in the second position for any of the rotational positions of the steering wheel.

The subject invention further provides for a method of operating a steering system for a vehicle. The steering system includes a steering column extending longitudinally along an axis, a steering wheel coupled to the steering column and rotatable relative to the steering column about the axis between a plurality of rotational positions, and a magnetic paddle shift system for selecting a gear of a transmission of the vehicle. The magnetic paddle shift system includes a sensor assembly mounted to the steering column and including a sensor array disposed about the axis. The magnetic paddle shift system further includes first and second paddle shifters mounted to the steering wheel and spaced from one another about the axis and rotatable with the steering wheel about the axis relative to the sensor assembly between the plurality of rotational positions. Each of the first and second paddle shifters extend radially away from the axis from a proximal end closer to the axis to a distal end for engagement by a user. A first magnet is disposed at the proximal end of the first paddle shifter. A second magnet is disposed at the proximal end of the second paddle shifter with the first and second magnets disposed in alignment with the sensor array in any of the rotational positions of the steering wheel. The first and second magnets are movable relative to the sensor array between a first position and a second position. The first and second magnets are spaced apart from the sensor array in both of the first and second positions.

The method includes the steps of actuating the first paddle shifter, moving the first magnet from the first position to the second position and closer to the sensor array, and sensing the first magnet in the second position with the sensor array for any of the rotational positions of the steering wheel for selecting a higher gear of the transmission. The method further includes the steps of actuating the second paddle shifter, moving the second magnet from the first position to the second position and closer to the sensor array, and sensing the second magnet in the second position with the sensor array for any of the rotational positions of the steering wheel for selecting a lower gear of the transmission.

Accordingly, the magnetic paddle shift system allows for an unlimited degree of rotation of the steering wheel with the first and second paddle shifters coupled thereto because there is no physical wired connection between the first and second paddle shifters and the steering column.

BRIEF DESCRIPTION OF THE DRAWINGS

Advantages of the subject invention will be readily appreciated as the same becomes better understood by reference to the following detailed description when considered in connection with the accompanying drawings.

FIG. 3A is a portion of the cross-sectional view of FIG. 2, showing the first paddle shifter in the first position.

DETAILED DESCRIPTION OF THE INVENTION

Figure 1:
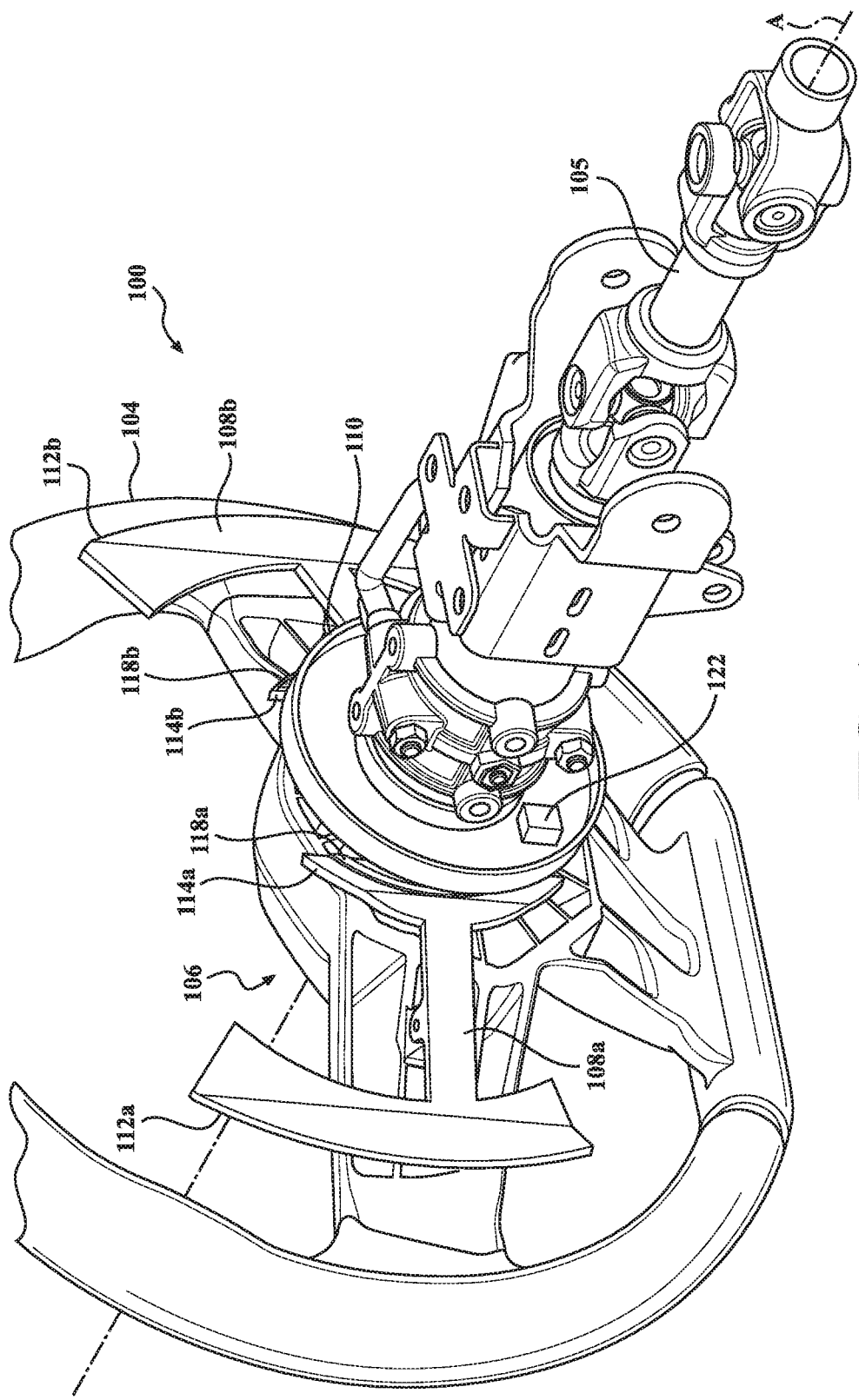
FIG. 1 is a perspective view of a steering system including a magnetic paddle shift system.

Referring to the Figures, wherein like numerals indicates like or corresponding parts throughout the several views a steering system 100 of a vehicle is generally shown in FIG. 1. The steering system 100 includes a steering column 105 extending longitudinally along an axis A and a steering wheel 104 coupled to the steering column 105 and rotatable relative to the steering column 105 about the axis A between a plurality of rotational positions. As described herein, the plurality of rotational positions refers to any rotational position of the steering wheel 104 relative to the steering column 105 within at least 360 degrees of rotation (i.e., with one full rotation or more than one full rotation of the steering wheel 104 about the axis A relative to the steering column 105). The steering system 100 further includes a magnetic paddle shift system 106 for selecting a gear of a transmission of the vehicle. The magnetic paddle shift system 106 includes a first paddle shifter 108a, a second paddle shifter 108b, and a sensor assembly 110. The magnetic paddle shift system 106 allows for an unlimited degree of rotation of the steering wheel 104 since there is no physical wired connection between the first paddle shifter 108a, the second paddle shifter 108b and the steering column 105, such as a clock spring connection found in a traditional paddle shift system.

The sensor assembly 110 is mounted to the steering column 105 (as shown in FIGS. 1-4B) and includes a sensory array disposed about the axis A as shown in FIGS. 5-9. More specifically, the sensor assembly 110 is mounted to an outer surface of the steering column 105. The sensor assembly 110 includes a sensor controller 122 in communication with the sensor array 116. The sensor controller 122 interprets data from the sensor array 116 and is configured to select a higher gear of the transmission when a first magnet 118a is in the second position and to select a lower gear of the transmission when a second magnet 118b is in the second position. More specifically, the sensor controller 122 manages the data received from the sensor array 116 and relays the information to the vehicle via a controller area network (CAN). Based on the data received from the sensor controller 122, a transmission control module (TCM) controls operation of the transmission of the vehicle. In response to the first paddle shifter 108a being actuated, the TCM may upshift the transmission to a higher gear. For example, when the current gear is set to third gear, once the first paddle shifter 108a is actuated, the TCM sets the new gear to fourth gear. In response to the second paddle shifter 108b being actuated, the TCM may downshift the transmission to a lower gear. The sensor controller 122 may also include a debounce circuit that manages signal bouncing and edge detection.

As shown in FIG. 1, the first and second paddle shifters 108a, 108b are mounted to the steering wheel 104 and spaced from one another about the axis A. The first and second paddle shifters 108a, 108b are rotatable with the steering wheel 104 about the axis A relative to the sensor assembly 110 between the plurality of rotational positions. Each of the first and second paddle shifters 108a, 108b extend radially away from the axis A from a proximal end 114a, 114b closer to the axis A to a distal end 112a, 112b for engagement by a user (more specifically, a driver). Said differently, the distal end 112a, 112b generally extends away from the center of the steering wheel 104 while the proximal end 114a, 114b generally extends towards the center of the steering wheel 104.

As shown in FIGS. 2-4B, the proximal end 114a, 114b of each of the first and second paddle shifters 108a, 108b substantially extends over the sensor assembly 110. The first magnet 118a is disposed at the proximal end 114a of the first paddle shifter 108a. The second magnet 118b is disposed at the proximal end 114b of second paddle shifter 108b. The first and second magnets 118a, 118b are disposed in alignment with the sensor array 116 in any of the rotational positions of the steering wheel 104.

Figure 3B:
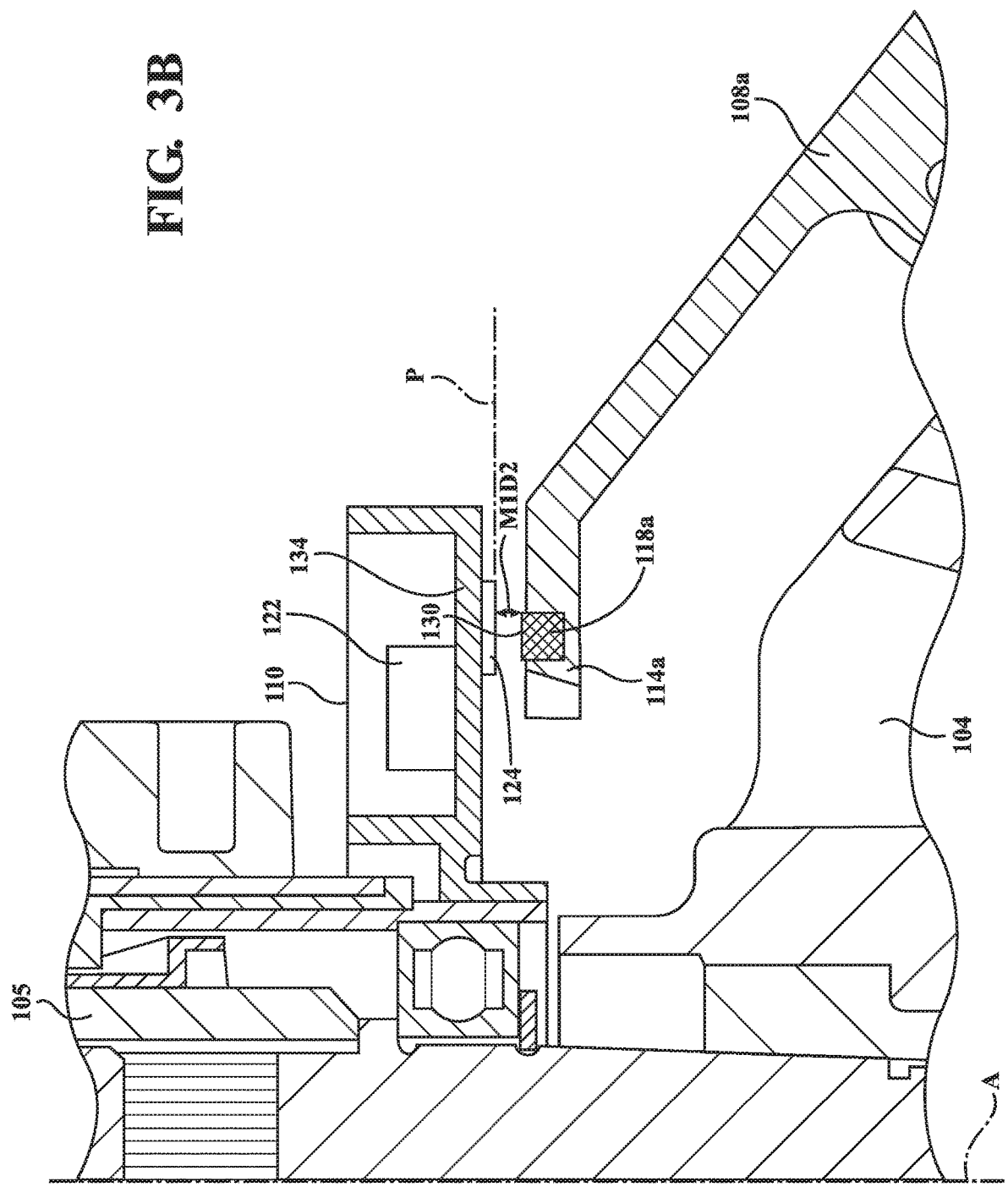
FIG. 3B is a portion of the cross-sectional view of FIG. 2, showing the first paddle shifter in the second position.
Figure 4A:
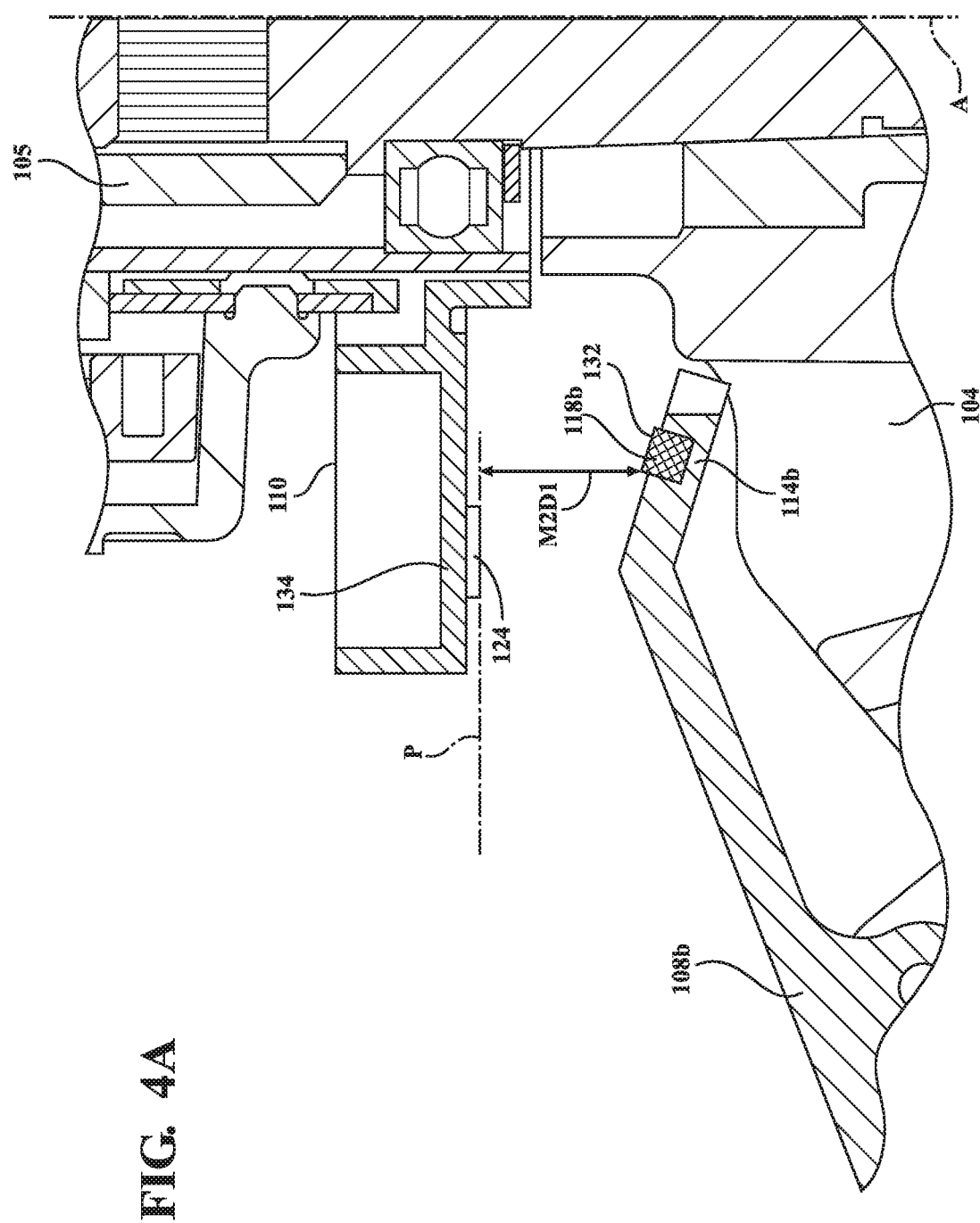
FIG. 4A is a portion of the cross-sectional view of FIG. 2, showing the second paddle shifter in the first position.
Figure 4B:
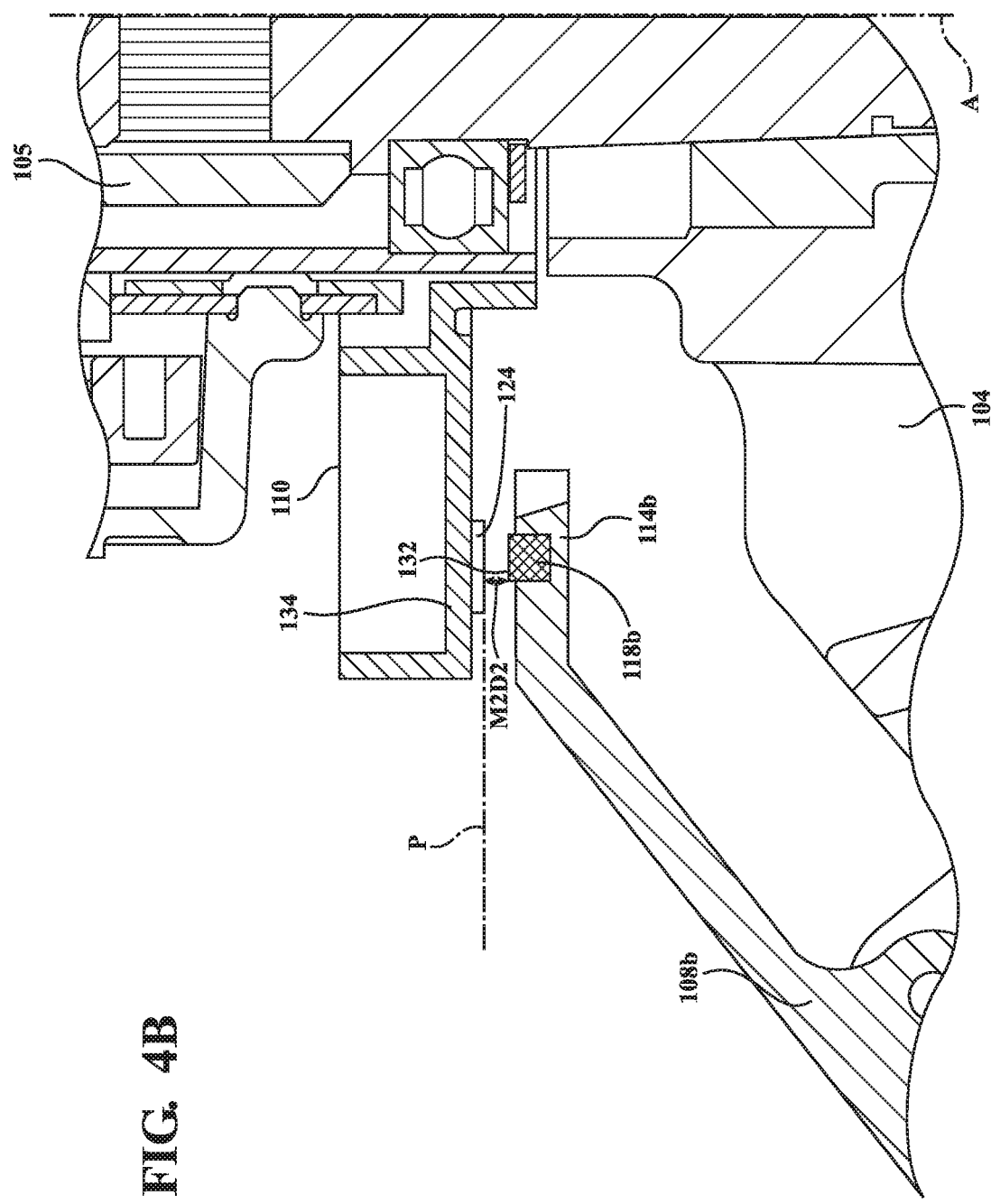
FIG. 4B is a portion of the cross-sectional view of FIG. 2, showing the second paddle shifter in the second position.

Actuation of the first and second paddle shifters 108a, 108b may move, respectively, the first and second magnets 118a, 118b relative to the sensor array 116 between a first position and a second position. More specifically, FIG. 3A shows the first magnet 118a disposed in the first position and FIG. 3B shows the first magnet 118a disposed in the second position. FIG. 4A shows the second magnet 118b disposed in the first position and FIG. 4B shows the second magnet 118b disposed in the second position. The first and second magnets 118a, 118b are spaced apart from the sensor array 116 in both of the first and second positions and are closer to the sensor array 116 in the second position compared to the first position. The sensor array 116 is configured to sense the first and second magnets 118a, 118b in the second position for any of the rotational positions of the steering wheel 104.

As shown in FIGS. 2-4B, the sensor array 116 may be disposed on an array plane P. Movement of the first and second magnets 118a, 118b between the first and second positions may be transverse to the array plane P. The array plane P may be generally orthogonal to the axis A. However, the array plane P may be disposed at any suitable angle relative to the axis A. The first magnet 118a may be spaced from the array plane P a first-magnet-first-distance M1D1 when disposed in the first position for any of the plurality of rotational positions, as shown in FIG. 3A. The first magnet 118a may be spaced from the array plane P by a first-magnet-second-distance M1D2 when disposed in the second position for any of the plurality of rotational positions, as shown in FIG. 3B. The first-magnet-first-distance M1D1 is greater than the first-magnet-second-distance M1D2. Similarly, the second magnet 118b is spaced from the array plane P a second-magnet-first-distance M2D1 when disposed in the first position for any of the plurality of rotational positions, as shown in FIG. 4A. The second magnet 118b is spaced from the array plane P a second-magnet-second-distance M2D2 when disposed in the second position for any of the plurality of rotational positions, as shown in FIG. 4B. The second-magnet-first-distance M2D1 is greater is than the second-magnet-second-distance M2D2.

Figure 2:
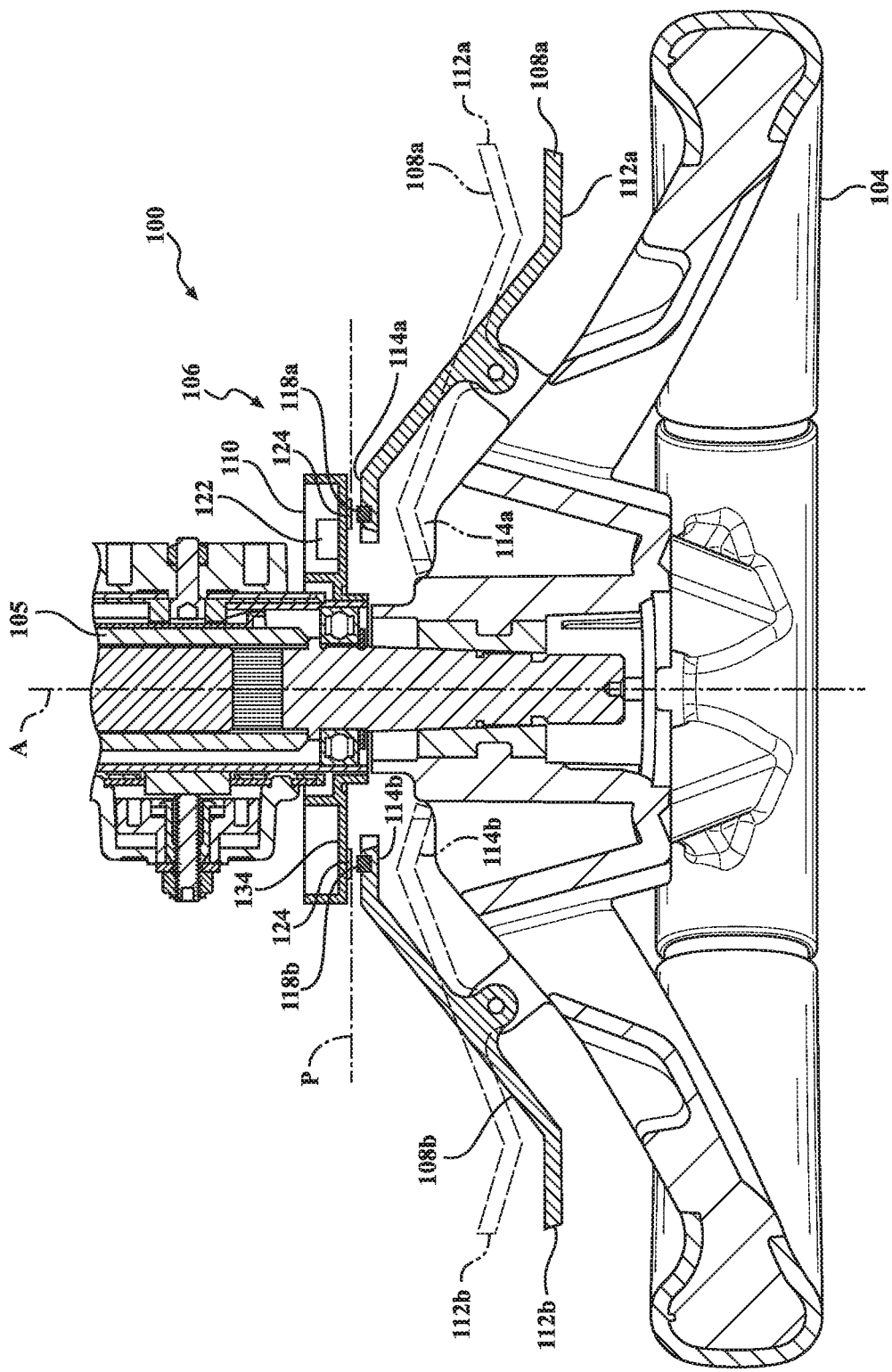
FIG. 2 is a cross-sectional view of the steering system showing a sensor assembly of the magnetic paddle shift system and first and second paddle shifters of the magnetic paddle shift system in first and second positions.

Each of the first and second paddle shifters 108a, 108b may be pivotally coupled to the steering wheel 104 between the proximal 114a, 114b and distal 112a, 112b ends, as shown in FIGS. 1 and 2. The pivotal coupling of the first and second paddle shifters 108a, 108b facilitates movement of the proximal end 114a, 114b of the first and second paddle shifters 108a, 108b when the respective distal end 112a, 112b of the first and second paddle shifters 108a, 108b moves toward the steering wheel 104. One having skill in the art will appreciate that the first and second paddle shifter 108b may be coupled to the steering wheel 104 in any suitable manner to facilitate movement of the first and second magnets 118a, 118b toward and away from the sensor assembly 110.

Although the first paddle shifter 108a is configured to upshift the transmission gear when actuated and the second paddle shifter 108b is configured to downshift the transmission gear when actuated, it is understood that the first paddle shifter 108a and the second paddle shifter 108b may be configured in the alternative.

The first and second magnets 118a, 118b have opposite polarities to facilitate the sensor array 116 distinguishing the first and second magnets 118a, 118b. Said differently, the sensor array 116 can detect the difference in polarity between the first and second magnets 118a, 118b and can send the appropriate instructions to the transmission depending on the positions of the first and second magnets 118a, 118b. The first and second magnets 118a, 118b may be axially magnetized parallel to the axis A. As such, the first and second magnets 118a, 118b may be positioned to present opposite polarities for the sensor array 116 to detect. More specifically, a north pole 130 of the axially magnetized first magnet 118a faces the sensor assembly 110 (as shown in FIGS. 3A and 3B) and a south pole 132 of the axially magnetized second magnet 118b faces the sensor assembly 110 (as shown in FIGS. 4A and 4B). It is to be appreciated that the polarity of the first magnet 118a and the polarity of the second magnet 118b may be of any suitable configuration or direction so long as the polarity of the first magnet 118a is different than the polarity of the second magnet 118b.

Figure 5:
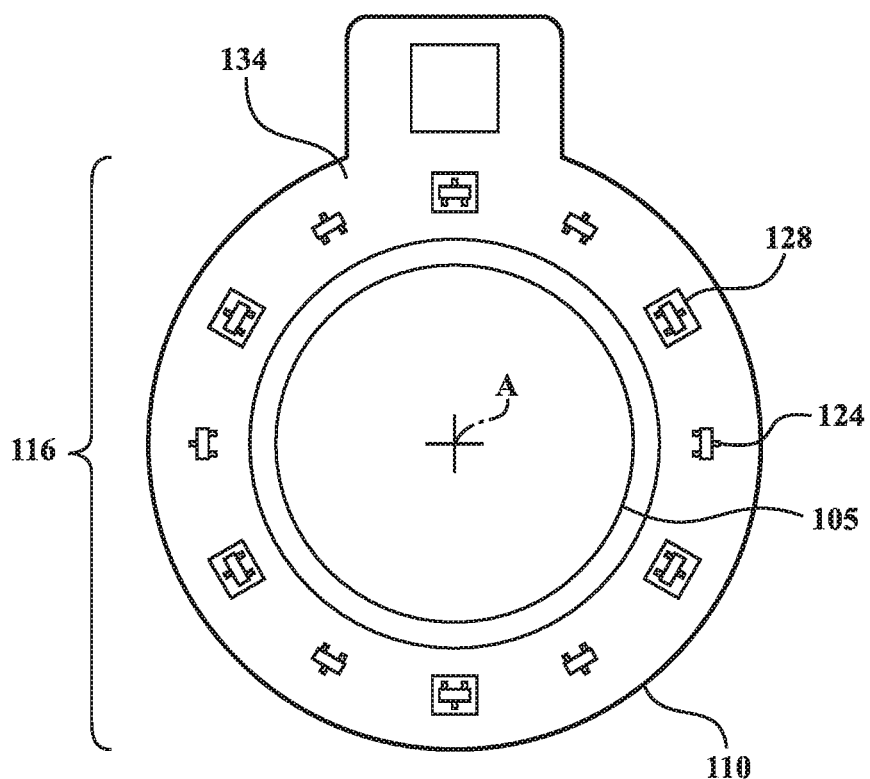
FIG. 5 is a plan view of the sensor assembly comprising a sensor array and a printed circuit board.

As shown in FIG. 5, the sensor array 116 may comprise a printed circuit board (PCB) 134 and a plurality of alternating polarity magnetic sensors 124, 128 spaced about the axis A on the printed circuit board 134. The plurality of alternating polarity magnetic sensors 124, 128 may be sequentially aligned in an annular configuration about the axis A. Moreover, the plurality of alternating polarity magnetic sensors 124, 128 may be evenly spaced from one another in sequential alignment in the annular configuration about the axis A.

The plurality of alternating polarity magnetic sensors 124, 128 of the sensor array 116 may comprise twelve alternating polarity magnetic sensors 124, 128 disposed on an annularly shaped printed circuit board (PCB) 134 that may be partially or fully enclosed in a housing. While the example of twelve sensors is provided, any number of sensors may be used. The plurality of alternating polarity magnetic sensors 124, 128 are further defined as Hall Effect sensors for measuring the magnetic flux passing therethrough. However, the alternating polarity magnetic sensors 124, 128 may be any other suitable sensor for measuring the magnetic flux passing therethrough.

The plurality of alternating polarity magnetic sensors 124, 128 may be unipolar (i.e., a single magnetic pole operates and releases the sensors as they move in and out of the magnetic field), with each further defined as one of a north polarity sensor and a south polarity sensor. The north polarity sensors 124 are turned on/off by a north magnetic pole, while the south polarity sensors 128 are turned on/off by a south magnetic pole. For example, in response to the first paddle shifter 108a being actuated by the user, the first magnet 118a is moved closer to the sensor assembly 110 such that the north polarity sensors 124 are turned on by the north magnetic pole of the first magnet 118a. Similarly, in response to the second paddle shifter 108b being actuated by the user, the second magnet 118b is moved closer to the sensor assembly 110 such that the south polarity sensors 128 are turned on by the south magnetic pole of the second magnet 118b.

The alternating polarity magnetic sensors 124, 128 output a signal indicative of magnetic flux passing through the sensor. The alternating polarity magnetic sensors 124, 128 may be configured to output a digital signal using Schmitt trigger circuit configuration such that a high-level signal indicates that magnetic flux above a predetermined threshold is passing through the sensor. A low-level signal outputted by the alternating polarity magnetic sensors 124, 128 indicates that the alternating polarity magnetic sensors 124, 128 are OFF (i.e., the magnetic flux passing through the sensor is below the predetermined threshold). A high-level signal outputted by the alternating polarity sensors, causes the sensor controller 122 to send a command to the TCM to switch gears. For example, in response to two or more of the north polarity sensors 124 outputting a high-level signal, the sensor controller 122 may instruct the TCM to upshift gears. In response to two or more of the south polarity sensors 128 outputting a low-level signal, the sensor controller 122 may instruct the TCM to downshift gears. While the magnetic paddle shift system 106 is described in terms of the alternating polarity magnetic sensors 124, 128 outputting digital signals, the magnetic paddle shift system 106 may be configured such that the alternating polarity magnetic sensors 124, 128 output analog signals.

The alternating polarity magnetic sensors 124, 128 are arranged at predetermined intervals around the PCB. The predetermined intervals may be set equal to each other so that the alternating polarity magnetic sensors 124, 128 are spaced evenly around the ring-shaped PCB. FIG. 5 shows that the alternating polarity magnetic sensors 124, 128 are arranged similar to the numbers on a clock with the north polarity sensors 124 arranged at even hours and the south polarity sensors 128 arranged at odd hours. The north polarity sensors 124 and the south polarity sensors 128 are at the same radial position.

As shown the FIGS. 5-9, the plurality of alternating polarity magnetic sensors 124, 128 are disposed on the same side of the printed circuit board 134. However, the magnetic paddle shift system 106 may be configured to allow for different arrangements of the alternating polarity magnetic sensors 124, 128. In another embodiment, the same polarity sensors may be arranged on a first side of the PCB that is facing the steering wheel 104 and opposite polarity sensors may be arranged on a second side of the PCB that is facing away from the steering wheel 104. For example, the PCB may have the north polarity sensors 124 arranged on the first side of the PCB and the south polarity sensors 128 arranged on the second side of the PCB.

Figure 6:
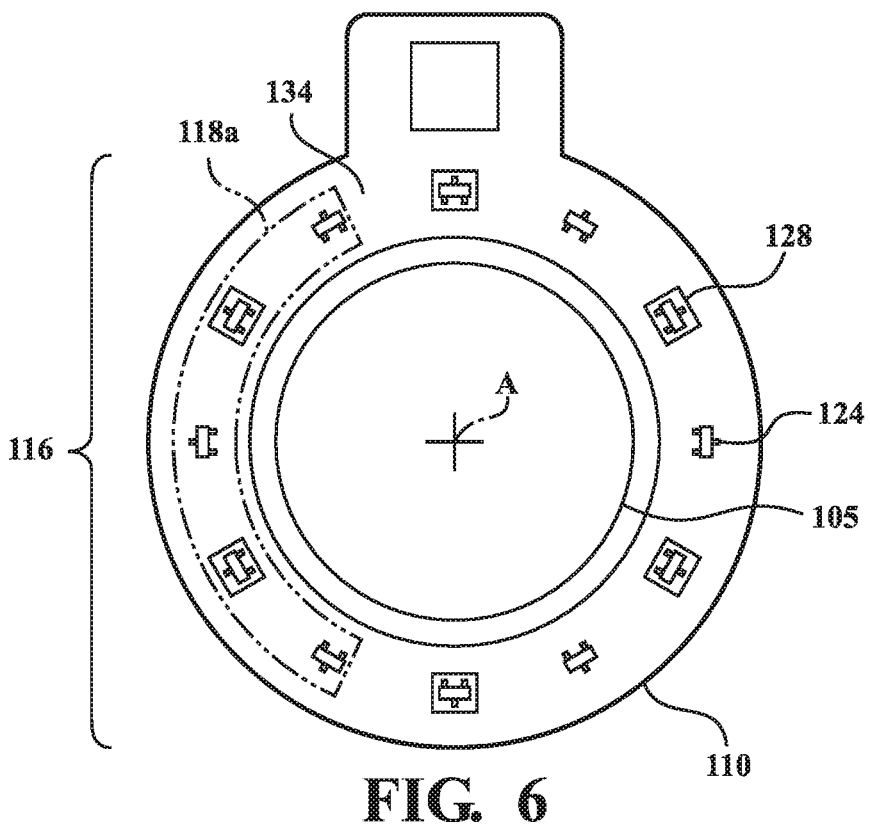
FIG. 6 is a plan view of the sensor assembly and the first magnet disposed over a portion of the sensor array.
Figure 7:
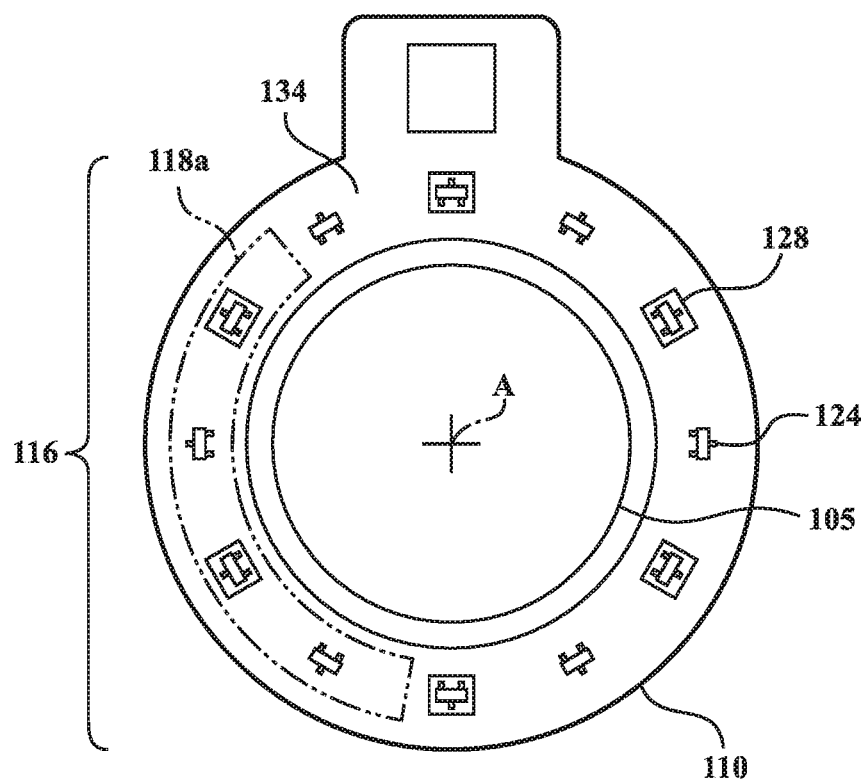
FIG. 7 is a plan view of the sensor assembly and the first magnet disposed over another portion of the sensor array.

With reference to FIGS. 6 and 7, the first magnet 118a is shown in cooperation with the sensor assembly 110. Each of the first and second magnets 118a, 118b may have a semi-annular configuration. More specifically, each of the first and second magnets 118a, 118b may have a half ring shape and, as discussed previously, be axially magnetized. While the first and second magnets 118a, 118b are described as having a half ring shape, another suitable shaped axially magnetized magnet may be used. Each of the first and second magnets 118a, 118b disposed over at least three of the plurality of alternating polarity magnetic sensors 124, 128 in any of the plurality of rotational positions. More specifically, the first magnet 118a is large enough to overlap at least two of the same polarity sensors of the alternating polarity magnetic sensors 124, 128 at any rotational position associated with the steering wheel 104 (with one of the opposite polarity sensors disposed between the same polarity sensor). However, the first and second magnets 118a, 118b may be disposed over more than three of the plurality of alternating polarity magnetic sensors 124, 128. For example, in FIG. 6, the first magnet 118a is shown overlapping three of the north polarity sensors 124. However, when the steering wheel 104 is rotated in the counterclockwise direction slightly, the first magnet 118a overlaps only two of the north polarity sensors 124 as shown in FIG. 7.

Figure 8:
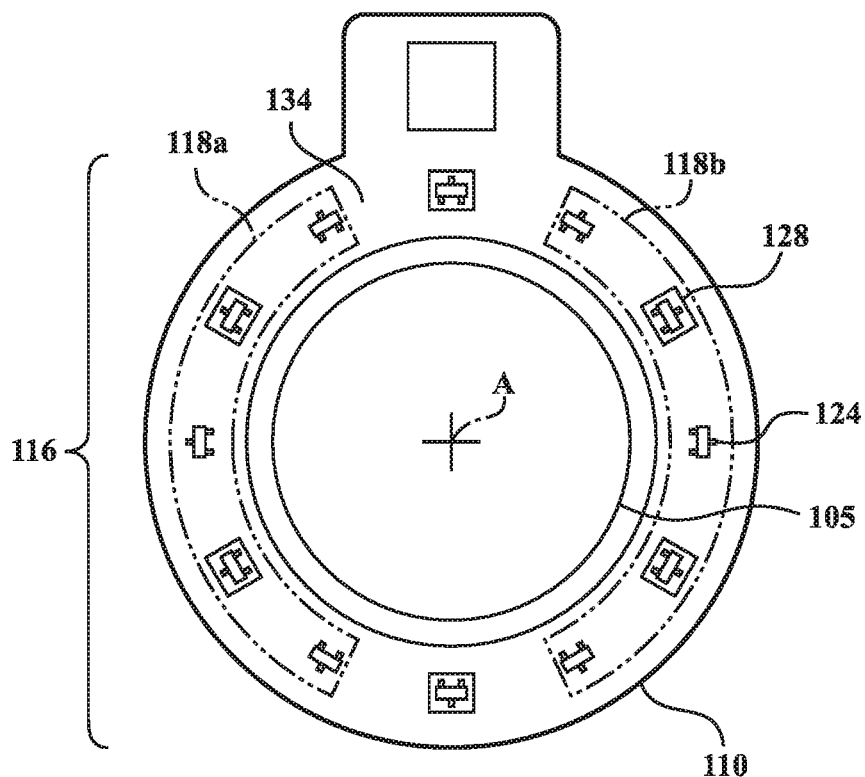
FIG. 8 is a plan view of the sensor assembly and the first and second magnets disposed in over portions of the sensor array.
Figure 9:
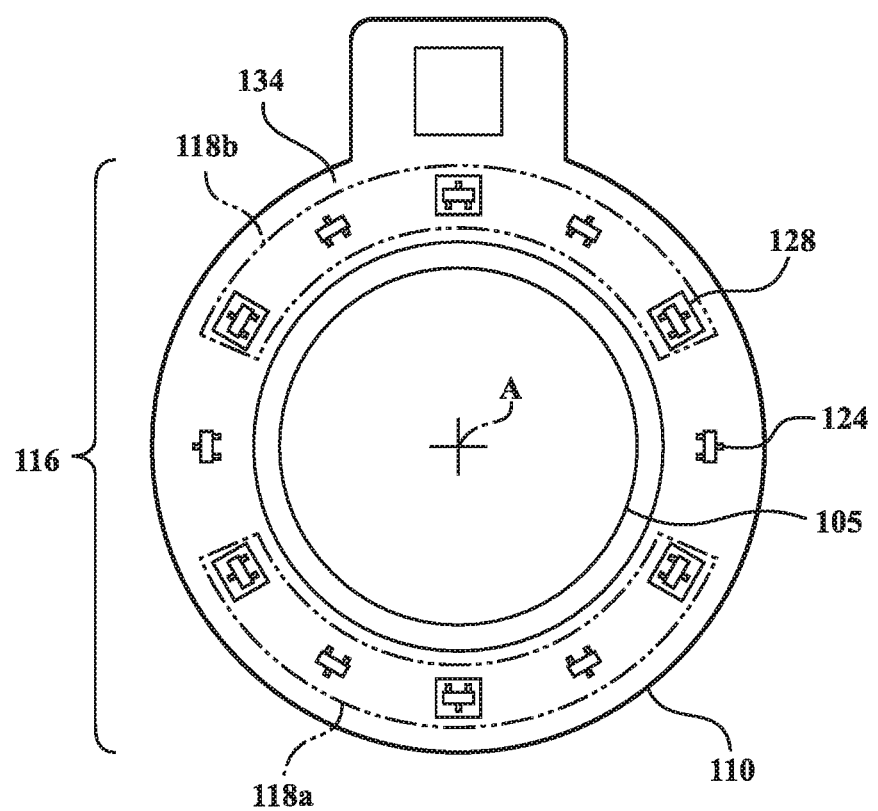
FIG. 9 is a plan view of the sensor assembly and the first and second magnets disposed in over other portions of the sensor array.

The shape of the first magnet 118a and the second magnet 118b may form almost a complete ring or circle when combined. FIG. 8 shows that the first magnet 118a and the second magnet 118b are radially aligned with the sensor array 116 and overlap all but two of the alternating polarity magnetic sensors 124, 128 at any given rotational position of the steering wheel 104. In FIG. 8, when the steering wheel 104 is in a neutral position (e.g., the steering wheel 104 is positioned such that the vehicle drives in a straight line), the first magnet 118a and the second magnet 118b cover all but two of the alternating polarity magnetic sensors 124, 128. In FIG. 9, the steering wheel 104 has been rotated from the neutral position. As a result, two different alternating polarity magnetic sensors 124, 128 are exposed. The first magnet 118a and the second magnet 118b move together and are rotated with the steering wheel 104.

In another embodiment, the PCB may be divided into an inner ring and an outer ring. The north polarity sensors 124 may be distributed at even intervals on the inner ring and the south polarity sensors 128 may be distributed at even intervals on the outer ring. With this configuration, the first magnet 118a and the second magnet 118b configurations may also be modified such that the first magnet 118a is radially aligned with the inner ring and the second magnet 118b is radially aligned with the outer ring.

Each of the first and second magnets 118a, 118b may be disposed over at least 120 degrees of the sensor array 116 in any of the plurality of rotational positions. More specifically, in embodiments with twelve alternating polarity sensors, the first magnet 118a overlaps 120 degrees of the sensor array 116 in order to cover at least two of the same polarity sensors at any rotational position of the steering wheel 104. In embodiments with more or less polarity sensors, the first magnet 118a size may vary. By modifying the size and arrangement of the first magnet 118a or by including additional magnets in the magnetic paddle shift system 106, the magnetic paddle shift system 106 can accommodate different functions.

In some embodiments, the magnetic paddle shift system 106 may be used to estimate the position of the steering wheel 104. A fixed magnet may be attached to the first paddle shifter 108a or the steering wheel 104. The fixed magnet is positioned closer to the sensor assembly 110 than the first magnet 118a such that one of the alternating polarity magnetic sensors 124, 128 is always activated by the fixed magnet. The position of the fixed magnet is fixed with respect to the distance between the sensor assembly 110 and the fixed magnet but is not rotationally fixed (i.e., the fixed magnet rotates with the steering wheel 104 but does not move closer to the sensor assembly 110 when the first paddle shifter 108a is actuated). The magnetic paddle shift system 106 may estimate the position of the steering wheel 104 based on which one of the alternating polarity magnetic sensors 124, 128 is activated by the fixed magnet. Under this embodiment, the first magnet 118a is still configured as described above to activate at least two of the alternating polarity magnetic sensors 124, 128 in response to being actuated.

In some embodiments, a ferromagnetic ring may be placed behind the sensor assembly 110. The ferromagnetic ring acts as a flux concentrator to increase the magnetic sensitivity of each of the magnetic sensors. The increase in magnetic sensitivity increases the resolution of the magnetic sensors, thereby making the magnetic paddle shift system 106 more reliable. The ferromagnetic ring may also act as a shield for stray magnetic fields.

A method of operating the steering system 100 for the vehicle is described herein. As mentioned above, the steering system 100 includes the steering column 105 extending longitudinally along the axis A, the steering wheel 104 coupled to the steering column 105 and rotatable relative to the steering column 105 about the axis A between the plurality of rotational positions, and the magnetic paddle shift system 106 for selecting the gear of the transmission of the vehicle, as shown in FIG. 1. As shown in FIG. 2, the magnetic paddle shift system 106 includes the sensor assembly 110 mounted to the steering column 105 and including the sensor array 116 disposed about the axis A. The magnetic paddle shift system 106 further includes first and second paddle shifters 108a, 108b mounted to the steering wheel 104 and spaced from one another about the axis A and rotatable with the steering wheel 104 about the axis A relative to the sensor assembly 110 between the plurality of rotational positions. Each of the first and second paddle shifters 108a, 108b extend radially away from the axis A from the proximal end 114a, 114b closer to the axis A to the distal end 112a, 112b for engagement by the user. The first magnet 118a is disposed at the proximal end 114a of the first paddle shifter 108a. The second magnet 118b is disposed at the proximal end 114b of the second paddle shifter 108b with the first and second magnets 118a, 118b disposed in alignment with the sensor array 116 in any of the rotational positions of the steering wheel 104. The first and second magnets 118a, 118b are movable relative to the sensor array 116 between the first position and the second position, as shown in FIGS. 3A-4B. The first and second magnets 118a, 118b are spaced apart from the sensor array 116 in both of the first and second positions.

The method includes the steps of actuating the first paddle shifter 108a, moving the first magnet 118a from the first position (as shown in FIG. 3A) to the second position (as shown in FIG. 3B) and closer to the sensor array 116, and sensing the first magnet 118a in the second position with the sensor array 116 for any of the rotational positions of the steering wheel 104 for selecting the higher gear of the transmission. The method further includes the steps of actuating the second paddle shifter 108b, moving the second magnet 118b from the first position (as shown in FIG. 4A) to the second position (as shown in FIG. 4B) and closer to the sensor array 116, and sensing the second magnet 118b in the second position with the sensor array 116 for any of the rotational positions of the steering wheel 104 for selecting the lower gear of the transmission.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit, a digital, analog, or mixed analog/digital discrete integrated circuit, a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

In general, the routines executed to implement the embodiments of the invention, whether implemented as part of an operating system or a specific application, component, program, object, module, or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail.

Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A steering system for a vehicle, comprising:
a steering column extending longitudinally along an axis;
a steering wheel coupled to said steering column and rotatable relative to said steering column about said axis between a plurality of rotational positions; and
a magnetic paddle shift system for selecting a gear of a transmission of the vehicle, said magnetic paddle shift system comprising:
a sensor assembly mounted to said steering column and comprising a sensor array disposed about said axis;
first and second paddle shifters mounted to said steering wheel and spaced from one another about said axis and rotatable with said steering wheel about said axis relative to said sensor assembly between said plurality of rotational positions, with each of said first and second paddle shifters extending radially away from said axis from a proximal end closer to said axis to a distal end for engagement by a user;
a first magnet disposed at said proximal end of said first paddle shifter, and a second magnet disposed at said proximal end of said second paddle shifter with said first and second magnets disposed in alignment with said sensor array in any of the rotational positions of said steering wheel;
wherein actuation of said first and second paddle shifters move, respectively, said first and second magnets relative to said sensor array between a first position and a second position, said first and second magnets being spaced apart from said sensor array in both of said first and second positions and being closer to said sensor array in said second position compared to said first position, with said sensor array being configured to sense said first and second magnets in said second position for any of the rotational positions of said steering wheel.

2. The steering system as set forth in claim 1, wherein said sensor array is disposed on an array plane, with movement of said first and second magnets between the first and second positions being transverse to said array plane.

3. The steering system as set forth in claim 2, wherein said array plane is generally orthogonal to said axis.

4. The steering system as set forth in claim 2, wherein said first magnet is spaced from said array plane by a first-magnet-first-distance when disposed in said first position for any of the plurality of rotational positions, and wherein said first magnet is spaced from said array plane by a first-magnet-second-distance when disposed in said second position for any of the plurality of rotational positions, with the first-magnet-first-distance being greater than the first-magnet-second-distance.

5. The steering system as set forth in claim 2, wherein said second magnet is spaced from said array plane by a second-magnet-first-distance when disposed in said first position for any of the plurality of rotational positions, and wherein said second magnet is spaced from said array plane by a second-magnet-second-distance when disposed in said second position for any of the plurality of rotational positions, with the second-magnet-first-distance being greater than the second-magnet-second-distance.

6. The steering system as set forth in claim 1, wherein said first and second magnets have opposite polarities to facilitate said sensor array distinguishing said first and second magnets.

7. The steering system as set forth in claim 1, wherein said first and second magnets are axially magnetized parallel to said axis.

8. The steering system as set forth in claim 7, wherein a north pole of said axially magnetized first magnet faces said sensor assembly and a south pole of said axially magnetized second magnet faces said sensor assembly.

9. The steering system as set forth in claim 1, wherein each of said first and second paddle shifters is pivotally coupled to said steering wheel between said proximal and distal ends.

10. The steering system as set forth in claim 9, wherein said pivotal coupling of said first and second paddle shifters facilitates movement of said proximal end of said first and second paddle shifters when said respective distal end of said first and second paddle shifters moves toward said steering wheel.

11. The steering system as set forth in claim 1, wherein said sensor array comprises a printed circuit board and a plurality of alternating polarity magnetic sensors spaced about said axis on said printed circuit board.

12. The steering system as set forth in claim 11, wherein said plurality of alternating polarity magnetic sensors are sequentially aligned in an annular configuration about said axis.

13. The steering system as set forth in claim 12, wherein said plurality of alternating polarity magnetic sensors are evenly spaced from one another in sequential alignment in the annular configuration about said axis.

14. The steering system as set forth in claim 11, wherein each of said first and second magnets has a semi-annular configuration, with each of said first and second magnet disposed over at least three of said plurality of alternating polarity magnetic sensors in any of the plurality of rotational positions.

15. The steering system as set forth in claim 14, wherein each of said first and second magnets is disposed over at least 120 degrees of said sensor array in any of the plurality of rotational positions.

16. The steering system as set forth in claim 11, wherein said plurality of alternating polarity magnetic sensors are further defined as Hall Effect sensors for measuring the magnetic flux passing therethrough.

17. The steering system as set forth in claim 11, wherein said plurality of alternating polarity magnetic sensors are unipolar, with each further defined as one of a north polarity sensor and a south polarity sensor.

18. The steering system as set forth in claim 11, wherein said plurality of alternating polarity magnetic sensors are disposed on the same side of said printed circuit board.

19. The steering system as set forth in claim 1, wherein said sensor assembly comprises a sensor controller in communication with said sensor array, with said sensor controller interpreting data from said sensor array and is configured to select a higher gear of the transmission when said first magnet is in the second position and to select a lower gear of the transmission when said second magnet is in the second position.

20. A method of operating a steering system for a vehicle, the steering system comprising a steering column extending longitudinally along an axis, a steering wheel coupled to the steering column and rotatable relative to the steering column about the axis between a plurality of rotational positions, and a magnetic paddle shift system for selecting a gear of a transmission of the vehicle, the magnetic paddle shift system comprising a sensor assembly mounted to the steering column and comprising a sensor array disposed about the axis, first and second paddle shifters mounted to the steering wheel and spaced from one another about the axis and rotatable with the steering wheel about the axis relative to the sensor assembly between the plurality of rotational positions, with each of the first and second paddle shifters extending radially away from the axis from a proximal end closer to the axis to a distal end for engagement by a user, a first magnet disposed at the proximal end of the first paddle shifter, and a second magnet disposed at the proximal end of the second paddle shifter with the first and second magnets disposed in alignment with the sensor array in any of the rotational positions of the steering wheel, the first and second magnets being movable relative to the sensor array between a first position and a second position, the first and second magnets being spaced apart from the sensor array in both of the first and second positions, said method comprising the steps of:

- actuating the first paddle shifter;
- moving the first magnet from the first position to the second position and closer to the sensor array;
- sensing the first magnet in the second position with the sensor array for any of the rotational positions of the steering wheel for selecting a higher gear of the transmission;
- actuating the second paddle shifter;
- moving the second magnet from the first position to the second position and closer to the sensor array; and
- sensing the second magnet in the second position with the sensor array for any of the rotational positions of the steering wheel for selecting a lower gear of the transmission.

* * * * *